US009917609B2

(12) United States Patent
Smith et al.

(10) Patent No.: US 9,917,609 B2
(45) Date of Patent: Mar. 13, 2018

(54) SYSTEM AND METHOD FOR AUTOMATIC DETECTION AND ENABLEMENT OF A VIRTUAL SIM ON A MOBILE DEVICE (71) Applicant: BlackBerry Limited, Waterloo (CA)

(72) Inventors: Andrew Christopher Smith, Oakville (CA); Nathan Provo, Ravensdale, WA (US); Srdan Dikic, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 14/814,752

(22) Filed: Jul. 31, 2015

(65) Prior Publication Data

US 2017/0033823 A1 Feb. 2, 2017

(51) Int. Cl.
H04M 1/00 (2006.01)
H04B 1/3816 (2015.01)
H04W 8/18 (2009.01)
(52) U.S. Cl.
CPC ............ H04B 1/3816 (2013.01); H04W 8/18 (2013.01); H04W 8/183 (2013.01)
(58) Field of Classification Search
CPC ..... H04W 12/06; H04W 88/06; H04W 12/04; H04W 12/02; H04W 4/005; H04W 52/0216; H04W 52/0235; H04W 8/26; H04W 12/08; H04W 48/18; H04W 4/001; H04W 8/245; H04W 36/00; H04W 36/22; H04W 48/02; H04W 48/06; H04W 4/003; H04W 60/005
USPC ........................................................ 455/558
See application file for complete search history.

(56) References Cited

U.S. PATENT DOCUMENTS

| 8,738,729 | B2 | 5/2014 | Haggerty et al. |
| 9,426,731 | B1* | 8/2016 | Uy ........................ H04W 48/18 |
| 2010/0210304 | A1 | 8/2010 | Huslak |
| 2012/0108204 | A1 | 5/2012 | Schell et al. |
| 2012/0108295 | A1 | 5/2012 | Schell et al. |
| 2013/0023235 | A1 | 1/2013 | Fan et al. |
| 2014/0315535 | A1 | 10/2014 | Bajko |
| 2015/0017950 | A1 | 1/2015 | Zhao et al. |

(Continued)

OTHER PUBLICATIONS

U.S. Appl. No. 14/725,498, filed May 29, 2015, Thomas Leonard Trevor Plestid.

(Continued)

*Primary Examiner* — Ajibola Akinyemi
(74) *Attorney, Agent, or Firm* — Rowand LLP (57) ABSTRACT

A method implemented by an enterprise server to facilitate activation of a virtual subscriber identity module (SIM) service on a mobile communication device. The method includes detecting a triggering event and in response to detecting the triggering event: determining that a SIM application on a physical universal integrated circuit card (UICC) currently inserted into the mobile communication device is associated with a mobile network operator (MNO) providing one or more virtual SIMs to which the enterprise server has access; determining whether the SIM application on the physical UICC is associated with one of the virtual SIMs provided by the MNO; and if the SIM application on the physical UICC is associated with a virtual SIM provided by the MNO, sending a message to the mobile communication device indicating that the mobile communication device is enabled for a virtual SIM service.

16 Claims, 4 Drawing Sheets

(56) References Cited

U.S. PATENT DOCUMENTS

| | | | |
|---|---|---|---|
| 2015/0079961 A1 | 3/2015 | Maguire et al. | |
| 2015/0215773 A1 | 7/2015 | Bai et al. | |
| 2015/0304506 A1* | 10/2015 | Zhu | H04M 15/49 455/406 |
| 2016/0049975 A1* | 2/2016 | Uy | H04B 1/3816 455/558 |

OTHER PUBLICATIONS

U.S. Appl. No. 14/725,450, filed May 29, 2015, Peter Steven Pieda.
EPO, Extended European Search Report relating to EP Application No. 16175109.4, dated Nov. 8, 2016.
EPO, EP Office Action relating to EP application No. 16175109.4, dated Aug. 1, 2017.

* cited by examiner

SYSTEM AND METHOD FOR AUTOMATIC DETECTION AND ENABLEMENT OF A VIRTUAL SIM ON A MOBILE DEVICE

TECHNICAL FIELD

The present disclosure relates to mobile communication devices and, in particular, to mobile communication devices having both work and personal applications.

BACKGROUND

Mobile communication devices, including cellular phones and smartphones, usually contain a physical smart card, such as a universal integrated circuit card (UICC), having one or more applications used to authenticate and identify subscribers on a cellular network. Such applications may include, for example, a subscriber identity module (SIM) application for global system for mobile communication (GSM) networks or a universal subscriber identity module (USIM) application for universal mobile telecommunications systems (UMTS). Once a mobile communication device is authenticated to a cellular network, the device may be enabled for voice and data communications, depending on the subscription with the cellular network.

One trend in the modern workplace is to implement a "bring your own device" policy, which allows employees to bring their personally owned devices to work and use those devices to access enterprise services. The BYOD policy can present a number of challenges for an enterprise as well as the end user of a device. For example, under a BYOD scheme, it may be difficult to distinguish between private and work-related communications and data usage, rendering the separation of communication costs for personal and business use a complicated task. Similar challenges exist for corporate owned and personal enabled (COPE) devices, where employees are issued corporate devices that are connected to personal services and applications.

BRIEF DESCRIPTION OF DRAWINGS

Reference will now be made, by way of example, to the accompanying drawings which show example embodiments of the present application and in which.

Similar reference numerals may have been used in different figures to denote similar elements and features.

DETAILED DESCRIPTION OF EXAMPLE EMBODIMENTS

In one aspect, the present disclosure describes a method implemented by an enterprise server to facilitate activation of a virtual subscriber identity module (SIM) service on a mobile communication device, the method comprising: detecting a triggering event, and in response to detecting the triggering event: determining that a SIM application on a physical universal integrated circuit card (UICC) currently inserted into the mobile communication device is associated with a mobile network operator (MNO) providing one or more virtual SIMS to which the enterprise server has access; determining whether the SIM application on the physical UICC is associated with one of the virtual SIMs provided by the MNO; and if the SIM application on the physical UICC is associated with a virtual SIM provided by the MNO, sending a message to the mobile communication device indicating that the mobile communication device is enabled for a virtual SIM service.

In another aspect, the present disclosure describes a method implemented by a mobile device management (MDM) server to facilitate activation of virtual SIM services on mobile communication devices being managed by the MDM server, the method comprising: requesting an MNO to provide the MDM server with access to one or more virtual SIMs; and for each mobile communication device managed by the MDM server: if a SIM application on a physical UICC currently inserted into the mobile communication device is associated with the MNO, determining whether the SIM application on the physical UICC is associated with one of the virtual SIMs to which the MDM server has access; and if the SIM application on the physical UICC is associated with a virtual SIM to which the MDM server has access, sending a message to the mobile communication device indicating that the mobile communication device is enabled for a virtual SIM service.

In yet another aspect, the present disclosure describes a server configured to facilitate activation of a virtual SIM service on a mobile communication device, the server comprising a processor and a communications subsystem, wherein the server is configured to: detect a triggering event, and in response to detecting the triggering event, determine that a SIM application on a physical UICC currently inserted into the mobile communication device is associated with an MNO providing one or more virtual SIMs to which the server has access; determine whether the SIM application on the physical UICC is associated with one of the virtual SIMs provided by the MNO; and if the SIM application on the physical UICC is associated with a virtual SIM provided by the MNO, send a message to the mobile communication device indicating that the mobile communication device is enabled for a virtual SIM service.

Other example embodiments of the present disclosure will be apparent to those of ordinary skill in the art from a review of the following detailed descriptions in conjunction with the drawings.

The present disclosure makes reference to "physical SIMs" associated with mobile communication devices. A "physical SIM" will be understood to refer to an executable SIM application that resides on a physical UICC used in a mobile communication device. It will be appreciated that an UICC may be associated with a single SIM application (e.g. single phone number) or multiple SIM applications (e.g. allowing switching between multiple phone numbers).

In the present application, the terms "virtual SIM" and "virtual MSISDN" are used interchangeably and refer to a virtual identity assigned by a mobile network operator to provide an additional subscriber profile (e.g. additional phone number) on a mobile communication device. For example, a virtual SIM may comprise a phone number that is purchased from a service pool of an MNO or a virtual SIM service provider. A virtual SIM may be hosted at a remote location (e.g. virtual SIM server or database) or downloaded over-the-air to a mobile communication device.

The present application relates to the addition of one or more subscriber identities on a mobile communication device. In an enterprise setting, mobile network operators can offer corporate identities to privately owned devices, for example, by provisioning a corporate number as a second line onto an employee's personal device. Communication charges for a device may be separated such that work-related calls, text messages and data usage can be billed to an employer, while personal consumption of communication and data services can be billed to an individual user of the device. It will be appreciated, however, that the present application is not limited to a split between work and personal profiles, and other examples of providing multiple phone lines to a device are contemplated by the present disclosure. For example, in some embodiments, a mobile communication device may be shared between two users, with each user having a separate plan on the device.

In one aspect, the present application proposes methods for automatically detecting opportunities to provide additional subscriber identities to mobile communication devices and dynamically enabling additional phone numbers on the devices. In an enterprise environment where mobile device management is administered, data may be collected from managed devices associated with a plurality of employees of the enterprise. Rather than relying on an administrator of the device management system to actively monitor managed devices and independently initiate addition of subscriber identities, the present methods use collected data from the devices to automatically identify whether a device can receive additional subscriber identities and to determine suitable subscriber identities to push to a device.

Figure 1:
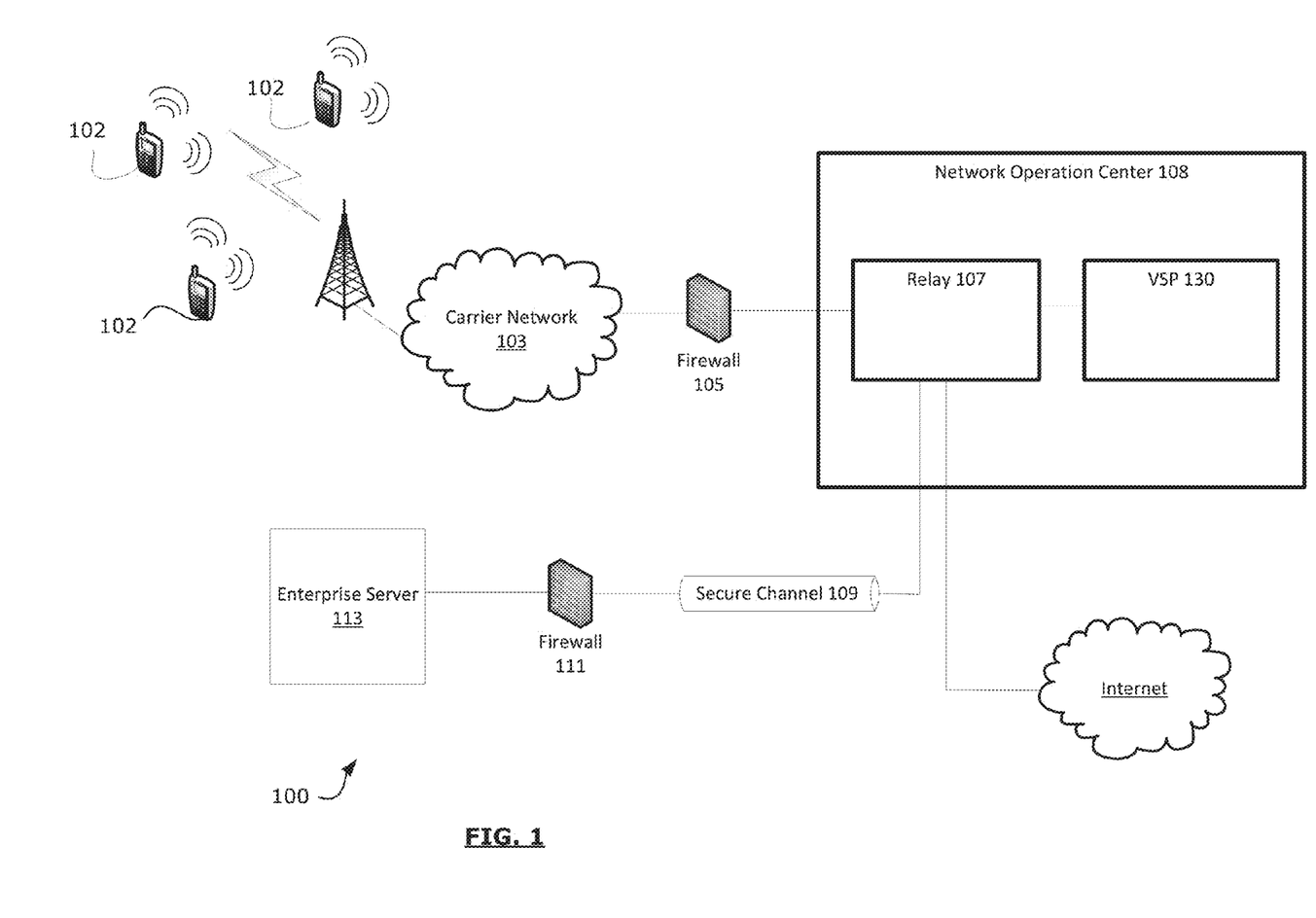
FIG. 1 shows a block diagram of an example wireless communications network in accordance with example embodiments of the present disclosure.

Reference is now made to FIG. 1, which shows a block diagram of an example wireless communications network 100 in accordance with the present disclosure. Mobile communication devices 102 are connected over a carrier network 103 for communication through a firewall 105 to a relay 107 within a network operation center 108. As illustrated in FIG. 1, communication from mobile communication devices 102 may be received at relay 107 and passed, via a secure channel 109, to an enterprise server 113. A mobile communication device that receives policies through an enterprise mobility management server, such as a BlackBerry Enterprise Service, may be configured to use such infrastructure. In particular, in at least some embodiments, the enterprise server 113 may implement a mobile device management (MDM) system. An MDM system includes a central server component, which administers and monitors the mobile communication devices 102, and a client component, which can be run on the mobile communication devices 102 to receive and execute management commands from the server component. The MDM system enables an administration server to, among other functionalities, configure and update device settings over-the-air, enforce security policies and compliance rules, and remotely deploy applications to end-users. Many MDM systems are implemented via device management software that can run on subscriber devices.

In similar manner, policies and data may be pushed from the enterprise server 113 over secure channel 109 to relay 107, where the policies and data are subsequently transmitted over the carrier network 103 to mobile communication devices 102. Other configurations may be available for providing communication channels between mobile communication devices 102 and the enterprise server 113.

In at least some embodiments, the network operation center 108 may include a virtual SIM platform (VSP) 130 that is controlled by a mobile network operator. An enterprise can request to receive virtual MSISDNs from a mobile network operator. Upon receiving a request from the enterprise, the MNO may create one or more accounts for the enterprise on a carrier-specific VSP deployment (i.e. VSP account) and allocate a plurality of virtual MSISDNs to the account (e.g. a block of phone numbers). The MNO may also provide the enterprise with credentials, such as usernames and passwords, to allow the enterprise to configure the VSP account(s) and administer the provision of virtual SIMs to managed mobile devices. In some embodiments, the enterprise server may store a pool of virtual MSISDNs, pre-assigned to the enterprise server by the MNO, within a carrier-specific VSP account. By associating one or more virtual MSISDNs from the pool with physical SIMs of managed devices, the enterprise server can remotely provide multiple subscriber identities to the devices in the enterprise. As the enterprise may maintain VSP accounts with a plurality of MNOs, the enterprise server may be configured to synchronize its VSP accounts information using the credentials provided by each of the MNOs. In some embodiments, the enterprise server may also be configured to retrieve its VSP accounts data from the MNOs in real-time. For example, an administrator of the enterprise server may request to receive VSP accounts information from all or a subset of the MNOs with which the enterprise maintains VSP accounts and receive, from the MNOs, current information (e.g. number of available virtual SIMs, number of virtual SIMs in use, status of account, etc.) for the VSP accounts.

Using the above architecture, separation of data consumption and bill splitting between private and business use may be achieved in two ways. A first method involves using a dual access point name (APN) in which there are two APNs provided by a mobile network operator. The MNO may then track how much data is used on each APN. In a second method, the MNO may only have one APN and monitor on the device how much data is transmitted via a work space and a personal space.

In order to support both a physical SIM and a virtual SIM, a mobile communication device may need to support a VSP service. In at least some embodiments, a mobile communication device may include a VSP service manager which is configured to enable and disable connections or identities on the device. Once a VSP service on a device is configured for both voice communication and data usage, interactions with the carrier network through the mobile network operator may be routed on different interfaces. Specifically, on a VSP device activation, a VSP service manager may add a second access point name along with a cellular logical interface. For example, data transmitted over a second APN of a device after a virtual SIM is enabled may be distinguished as work-related data usage.

Figure 2:
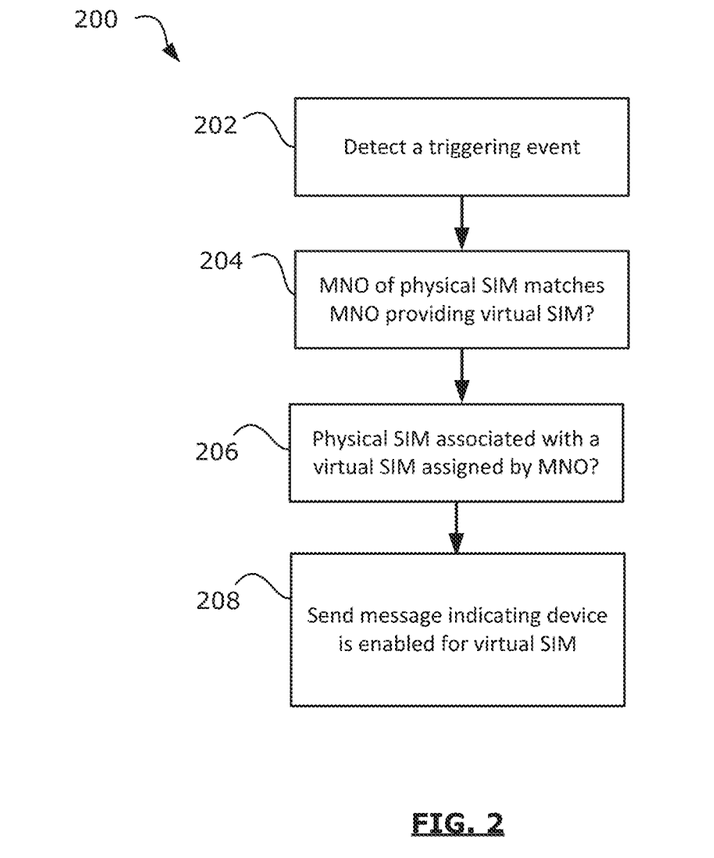
FIG. 2 shows, in flowchart form, an example method for facilitating activation of a virtual SIM service on a mobile communication device in accordance with example embodiments of the present disclosure.

Reference is now made to FIG. 2, which shows, in flowchart form, an example method 200 for facilitating activation of a virtual SIM service on a mobile communication device. In at least some embodiments, the process 200 may be implemented by a server such as the enterprise server 113 shown in FIG. 1. By way of example, the process 200 may be implemented by an MDM server that is communicably connected to a plurality of managed mobile communication devices within an enterprise.

In operation 202, the server detects a triggering event. In at least some embodiments, the triggering event may be associated with the mobile communication device. For example, a triggering event may be an activity associated with a specific mobile communication device indicating that an additional subscriber identity may be required or appropriate for the device. In an enterprise environment, several such triggering events may be possible. For example, an UICC inserted into a managed mobile communication device may be removed and replaced by a different UICC. When an employee of an enterprise swaps a UICC on her mobile communication device with a different UICC containing a new physical SIM, it may be desirable to check whether the new physical SIM is associated with a virtual SIM that has been made available to the server. By way of illustration, a new employee in an organization may be provided with a company-owned mobile device and a SIM card at the time of beginning her employment. The replacing of the previous SIM card associated with the mobile device (e.g. SIM card belonging to the previous employee who used the device) with the new SIM card may be a triggering event that is detectable by the server. As an additional example, an employee may switch the SIM card in her device with a different SIM card when travelling to a geographical coverage area outside of her home network. This switching of the SIM cards may be detected by a mobility management server as a triggering event.

A triggering event may also be detected when a mobile device is activated with an enterprise server. For example, an approval, by an MDM server, of a request to register a new device with the server may be a triggering event. Such request may be received by the server when a new employee is issued a device by the enterprise and the employee attempts to activate the device with the server in order to enable corporate services on the device. The new device may contain a physical SIM that was issued by an MNO and both the device and the physical SIM may have been previously unknown to the server before the activation. As a further example, the first use of an idle device that is already registered and/or under management by the server can also be a triggering event. The activation of a device with an enterprise server may cause the server to check whether a physical SIM of the activated device is associated with a virtual SIM to which the server has access (e.g. assigned to the server by a virtual SIM service provider).

Other examples of triggering events may also be available. For example, a triggering event may be detected when a new VSP account including a pool of virtual SIMs is made available to the enterprise server (e.g. MDM server). In some embodiments, the server may explicitly request for a plurality of virtual SIMs to be assigned exclusively to the server by a new MNO. In other embodiments, the server may be granted access to a shared pool of virtual SIMs provided by an MNO, where the pool may be shared amongst a plurality of servers. A triggering event may also be detected when one or more additional virtual SIMs are provided to an existing VSP account for an enterprise server. For example, one or more virtual MSISDNs or phone numbers may be added to a pre-existing VSP account for a server, allowing the server to enable virtual SIM service to more of the devices that are currently under its management.

In at least some embodiments, the server is able to detect a triggering event associated with a mobile communication device based on data received from the device. When a device first registers with an enterprise server for mobility management, the device may provide the server with information identifying the UICC currently inserted into the device. For example, identifying information for a UICC may include, among others, an integrated circuit card identifier (ICCID) associated with the UICC, one or more IMSIs and/or MSISDNs of the UICC, or authentication keys associated with one or more SIMs residing on the UICC. The initial identifying information for the UICC may be stored at the server and associated with the registering device and/or a user of the device. Following registration of a device, the server may receive periodic updates from the device indicating the identity of the UICC currently in the device. For example, such updates may be sent by the device to the server at predetermined regular intervals or at predetermined times. Alternatively, the device may be configured to send an update of UICC identifying information to the server at the time of a pre-selected event. A pre-selected event may be an event for which a change of the physical SIM of a device is likely or possible. For example, when a device enters a roaming state or an airplane mode, the device may automatically send an update of UICC information to the server. Based on the received periodic updates, the server may be able to determine, for a particular managed device, whether a change of the UICC has occurred.

The server may also be configured to detect a new activation of a device with the server. For example, in some embodiments, an MDM server may itself perform a device activation transaction for a managed device to enable communication and data capabilities for the device using a new physical SIM. A device that is enrolled into a device management program may register with the server and request initial setup information (e.g. corporate policies and controls, email protocols, etc.) from the server. The device can be activated with the server by configuring with user information (e.g. username and password provided by an administrator) and exchanging security settings with the server, such as a key used for data encryption/decryption In response to detecting a triggering event associated with a device currently under its management or with the server itself, in operation 204, the server determines whether a SIM application on a UICC currently inserted into a device is associated with a mobile network operator providing one or more virtual SIMs to the server. In particular, the MNO associated with a physical SIM of the device is compared with the MNOs corresponding to the VSP accounts available to the server to determine if there is a match. As described previously, an enterprise server may have access to a plurality of carrier-specific VSP accounts, with each VSP account containing one or more virtual SIMs pre-assigned to and/or accessible by the enterprise. If the MNO associated with a physical SIM of a device matches an MNO corresponding to a VSP account, the server may be able to facilitate activating a virtual SIM on the device. In at least some embodiments, the server may use the mobile country code (MCC) and/or the mobile network code (MNC) to identify the unique MNO associated with a physical SIM of the device. The obtained MCC and/or MNC of the physical SIM can be compared with identifying information for the MNOs associated with the VSP accounts. It will be appreciated that information identifying the MNO of a carrier-specific VSP account will be available to the enterprise server. For example, the server may store identifying information for an MNO with an associated VSP account when initializing or configuring the VSP account.

If there is a match between the MNO associated with a SIM application on the UICC and the MNO corresponding to a VSP account, in operation 206, the server determines whether the SIM application on the UICC is associated with one of the virtual SIMs provided by the MNO. A mobile subscriber to an MNO may be uniquely identified by, among others, an IMSI of a SIM on the subscriber's device and a mobile station international subscriber directory number (MSISDN). The server may use either the IMSI for a mobile subscriber or the MSISDN of the subscriber's device to compare against the virtual SIMs that have been assigned to the server. In particular, the MSISDN of the physical SIM on the device can be compared with the MSISDNs of the virtual SIMs provided by the MNO and to which the server has access, in order to determine if there is a match.

In at least some embodiments, the server may store a pool of virtual SIMSs, pre-assigned to the server by the MNO, within a carrier-specific VSP account. The server may store identifying information for each of the virtual SIMs, including an IMSI and/or an MSISDN, in association with the virtual SIM. In such cases, the server may survey its own VSP account to determine whether the physical SIM of the managed device is associated with a virtual SIM provided by the MNO by, for example, comparing the MSISDN of the physical SIM with the MSISDNs of the virtual SIMs from the MNO.

In some other embodiments, the pool of virtual SIMs may be stored in a VSP of the MNO. In such cases, the server can query the VSP of the MNO, via a web service call, by transmitting to the MNO information identifying the physical SIM of the managed device and the MNO may itself perform the check of whether the physical SIM on the device is associated with one of the virtual SIMs accessible by the server or allocated to the server by the MNO. For example, the server can transmit a query to the MNO, using the MSISDN of the physical SIM as an account in the query, to determine whether any virtual SIMs are associated with the physical SIM. In cases where a plurality of VSP accounts for the enterprise are maintained with a single MNO, multiple calls may be made by the server to query the MNO, including one or more calls to at least one of the plurality of VSP accounts.

In operation 208, if the physical SIM of the device is associated with a virtual SIM assigned to or accessible by the server, the server may send a message to the device indicating that the device is enabled for a virtual SIM service. In at least some embodiments, the message may include information that the device may require in retrieving one or more virtual SIMs for activating a virtual SIM service. For example, the server may include in the message an identifier of the particular physical SIM on the device that is enabled for a virtual SIM. The message may also include instructions for accessing an application server to download a VSP application for use in retrieving virtual SIMs from the VSP deployment of a mobile network operator. In some embodiments, the message may include information about the virtual SIM itself, such as the MSISDN (i.e. phone number) associated with the virtual SIM.

Figure 3:
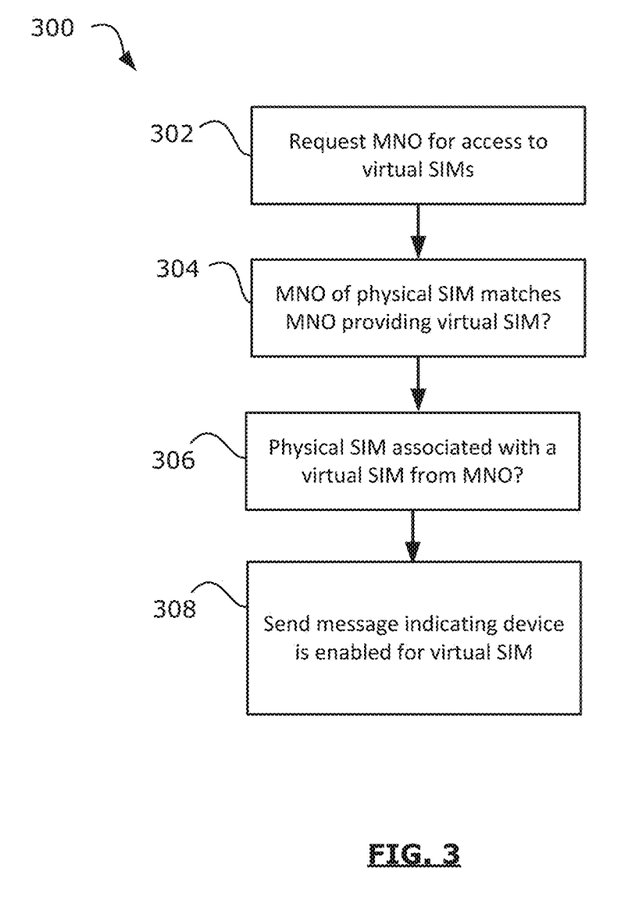
FIG. 3 shows, in flowchart form, another example method for facilitating activation of a virtual SIM service on a mobile communication device in accordance with example embodiments of the present disclosure.

Reference is now made to FIG. 3, which shows, in flowchart form, another example method 300 for facilitating activation of a virtual SIM service on a mobile communication device. In at least some embodiments, the process 300 may be implemented by a mobile device management server which manages a plurality of mobile communication devices in an enterprise.

In operation 302, an MDM server having a plurality of devices under its management may request a mobile network operator to provide the MDM server with access to a batch of virtual SIMs. The MDM server may query the MNO to determine which virtual SIMs are available for assignment to devices currently under the management of the server. In at least some embodiments, the MDM server may already have carrier-specific VSP accounts with one or more MNOs when requesting to receive access to additional virtual SIMs from one of the MNOs associated with pre-existing VSP accounts or a new MNO. For example, when a plurality of devices are newly registered with the MDM server, it may be desirable or necessary to acquire additional virtual SIMs to accommodate the new registrations.

Once the request is received by an MNO and one or more virtual SIMs are made available to the MDM server, the server can check the physical SIMs associated with devices currently under management to determine if any of those physical SIMs are associated with the new virtual SIMs. It will be appreciated that the server can perform these checks for all devices that are being managed or only a subset of the managed devices. In operation 304, the server checks whether a SIM application on a physical UICC currently inserted into a managed device is associated with the MNO providing the new virtual SIMs. If there is a match between the MNO associated with the physical SIM of a device and the MNO providing the virtual SIMs, the server next determines whether the physical SIM is associated with one of the new virtual SIMs to which the server has been granted access, in operation 306. For example, the server may compare the MSISDN of the SIM application on the UICC of the device with the MSISDNs of at least some of the virtual SIMs from the MNO. In some embodiments, the server may use identifying information for the physical SIM, such as its IMSI, ICCID or MSISDN, to query the VSP of the MNO whether the physical SIM is associated with one of the assigned virtual SIMs. In some other embodiments, the server may maintain its own carrier-specific VSP accounts containing pools of pre-assigned virtual SIMs and so the server may itself perform a check of the newly created and configured VSP account to determine whether any of the virtual SIMs from the pool is associated with the physical SIM of the device.

Upon determining that the physical SIM is associated with one of the new virtual SIMs, in operation 308, the server may send a message to the managed device indicating that the device is enabled for a virtual SIM service. For example, the message may include an identifier of the physical SIM/IMSI that is associated with one or more virtual IMSIs.

Figure 4:
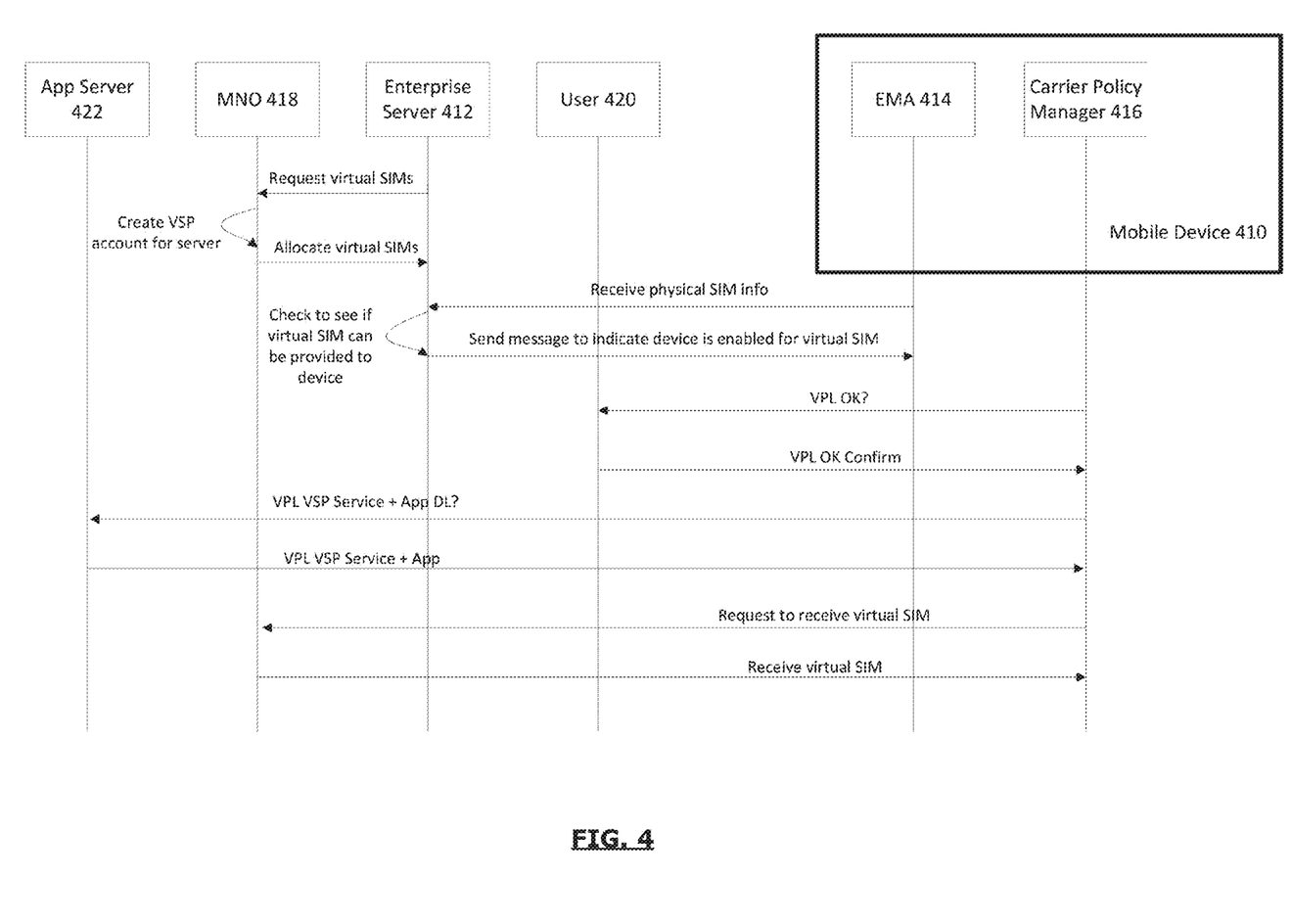
FIG. 4 shows a data flow diagram showing initialization of a virtual SIM service on a mobile communication device.

Reference is now made to FIG. 4, which shows a data flow diagram illustrating initialization of a virtual SIM service on a mobile communication device. Enterprise server 412 requests, from a VSP of an MNO 418, one or more virtual SIMs. Once the request is received, the MNO 418 creates an account on a carrier-specific VSP deployment (i.e. VSP account) for the enterprise, to which one or more MDM servers may have access, and allocates a plurality of virtual SIMs (e.g. block of phone numbers) to the account. The enterprise server 412 may receive VSP account credentials from the MNO. VSP account credentials allow the enterprise server 412 to access its VSP account with the MNO 418 and configure the server 412 for remote administration of virtual SIMs. In at least some embodiments, the VSP credentials can be provided to the enterprise server 412 by manually exporting a file from the VSP account. In some other embodiments, VSP accounts of the enterprise may be automatically discovered and the MNO 418 may send the VSP credentials to the enterprise server 412. Furthermore, in some cases, the MDM server may already have access to credentials (e.g. credentials for current VSP accounts) which may be used to automatically authenticate with new VSP accounts for which the server is granted access. The server 412 may then access its VSP account at the MNO 418 and retrieve the virtual SIMs allocated by the MNO 418 for storing at the server 412.

The server 412 receives data from the mobile communication device 410 and based, at least in part, on the received data, the server 412 determines whether the device 410 may be enabled for a virtual SIM service. In at least some embodiments, the server 412 communicates with an enterprise management agent (EMA) 414 on the device 410. The EMA 414 is a module which may be used for interacting with the server 412 for mobility management. In particular, the EMA 414 may receive messages transmitted by the server 412 and cause appropriate actions to be taken on the device 410. The EMA 414 may be configured to send device information to the server 412, such as the ICCID and one or more MSISDNs and IMSIs of the UICC currently in the device 410. The server 412 may store the received device information in memory and update the information with each new communication from the EMA 414.

Using the received device information, the server 412 can perform checks to determine whether a virtual SIM can be provided to the device 410. In at least some embodiments, the checks are performed by the server 412 according to the processes 200 and 300 of FIGS. 2 and 3, respectively, described above.

If the server 412 determines that a physical SIM of the device 410 is associated with one of the virtual SIMs assigned to the server 412, a message is sent to the device 410 indicating that the device 410 is enabled for a virtual SIM service. In at least some embodiments, the message sent to the device 410 may include an identifier of the physical SIM that is enabled for a virtual SIM and any necessary profile information to access an application server 422 and the VSP of the MNO 418.

In at least some embodiments, a virtual preload (VPL) of a VSP application may take place on the device 410. A carrier-branded VSP application, once installed on the device 410, can allow the device 410 to retrieve one or more virtual SIMs from the MNO's VSP deployment. The virtual preload may, in some embodiments, be provided to a user 420 of the device 410 for the user's approval. For example, a user may be prompted with a message requesting for confirmation of approval of the virtual preload. If the VPL is approved, the procedure for installing the VSP application may continue.

A carrier information manager 416 may then request, from the application server 422, the VSP service application. Application server 422 may be any remote server providing application data to mobile device 410 and the carrier information manager 416 accesses the application server 422 using the profile information pushed to the device 410 by the server 412. The application server 422 returns the VSP service application and the carrier policy manager causes the application to be installed on the device 410.

If the VSP application is launched successfully after installation, the application can retrieve its virtual SIMs from the VSP deployment of the MNO 418. Once the virtual SIMs are received by the device 410, a virtual SIM service may be enabled on the device 410. For example, a second access point name interface may be activated on the device 410 upon receiving the virtual SIMs, allowing virtual lines and bill splitting to be set up for use.

The various embodiments presented above are merely examples and are in no way meant to limit the scope of this application. Variations of the innovations described herein will be apparent to persons of ordinary skill in the art, such variations being within the intended scope of the present application. In particular, features from one or more of the above-described example embodiments may be selected to create alternative example embodiments including a sub-combination of features which may not be explicitly described above. In addition, features from one or more of the above-described example embodiments may be selected and combined to create alternative example embodiments including a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:

1. A method implemented by an enterprise server to facilitate activation of a virtual subscriber identity module (SIM) service on a mobile communication device, the method comprising:
   detecting insertion of a new universal integrated circuit card (UICC) into the mobile communication device or activation of the mobile communication device with the enterprise server in association with a new UICC; and
   in response to detecting the insertion of a new UICC into the mobile communication device or the activation of the mobile communication device with the enterprise server in association with a new UICC:
      determining that a SIM application on the new UICC is associated with a mobile network operator (MNO) that has provided one or more virtual SIMs to which the enterprise server has access;
      determining whether the SIM application on the new UICC is associated with one of the virtual SIMs provided by the MNO; and
      if the SIM application on the new UICC is associated with a virtual SIM provided by the MNO, sending a message to the mobile communication device indicating that the mobile communication device is enabled for a virtual SIM service
   wherein determining that a SIM application on the new UICC is associated with an MNO that has provided one or more virtual SIMs to which the enterprise server has access comprises:
      comparing the MNO associated with the UICC with one or more virtual SIM MNOs that have allocated virtual MSISDNs in carrier-specific VSIM accounts available to the server; and
      determining that there is a match between the MNO associated with the UICC and one of the virtual SIM MNOs.

2. The method of claim 1, wherein determining whether the SIM application on the new UICC is associated with one of the virtual SIMs provided by the MNO comprises comparing a mobile station international subscriber directory number (MSISDN) of the SIM application with an MSISDN of at least one of the virtual SIMs.

3. The method of claim 1, wherein detecting insertion of a new UICC into the mobile communication device comprises:
   receiving, from the mobile communication device, periodic updates including an identifier of an UICC currently inserted into the mobile communication device; and
   determining, based on received periodic updates, whether a change of UICC has occurred.

4. The method of claim 1, wherein detecting activation of the mobile communication device with the enterprise server comprises detecting a mobile communication device activation transaction.

5. The method of claim 1, wherein the enterprise server comprises a mobile device management (MDM) server which manages the mobile communication device.

6. The method of claim 1, wherein the one or more virtual SIMs provided by the MNO are included in a virtual SIM platform (VSP) account associated with the MNO.

7. The method of claim 1, wherein the message includes an identifier of the SIM application on the new UICC.

8. The method of claim 1, wherein determining whether the SIM application on the new UICC is associated with one of the virtual SIMs provided by the MNO comprises querying the MNO to determine if the SIM application on the new UICC is associated with the one of the virtual SIMs.

9. The method of claim 1, wherein the message identifies the virtual SIM for retrieval and activation on the mobile communication device.

10. A server configured to facilitate activation of a virtual subscriber identity module (SIM) service on a mobile communication device, the server comprising:
    a processor; and
    a communications subsystem,
    wherein the server is configured to:
        detect insertion of a new universal integrated circuit card (UICC) into the mobile communication device or activation of the mobile communication device with the enterprise server in association with a new UICC; and
        in response to detecting the insertion of the new UICC into the mobile communication device or the activation of the mobile communication device with the enterprise server in association with a new UICC:
            determine that a SIM application on the new UICC is associated with a mobile network operator (MNO) that has provided one or more virtual SIMs to which the server has access;
            determine whether the SIM application on the new UICC is associated with one of the virtual SIMs provided by the MNO; and
            if the SIM application on the new UICC is associated with a virtual SIM provided by the MNO, send a message to the mobile communication device indicating that the mobile communication device is enabled for a virtual SIM service wherein determining that a SIM application on the new UICC is associated with an MNO that has provided one or more virtual SIMs to which the enterprise server has access comprises:
    comparing the MNO associated with the UICC with one or more virtual SIM MNOs that have allocated virtual MSISDNs in carrier-specific VSIM accounts available to the server; and
    determining that there is a match between the MNO associated with the UICC and one of the virtual SIM MNOs.

11. The server of claim 10, wherein determining whether the SIM application on the new UICC is associated with one of the virtual SIMs that have been provided by the MNO comprises comparing an MSISDN of the SIM application with an MSISDN of at least one of the virtual SIMs.

12. The server of claim 10, wherein detecting insertion of a new UICC into the mobile communication device comprises:
    receiving, from the mobile communication device, periodic updates including an identifier of an UICC currently inserted into the mobile communication device; and
    determining, based on received periodic updates, whether a change of UICC has occurred.

13. The server of claim 10, wherein detecting activation of the mobile communication device with the server comprises detecting a mobile communication device activation transaction.

14. The server of claim 10, wherein the server comprises a mobile device management (MDM) server which manages the mobile communication device.

15. The server of claim 10, wherein the message includes an identifier of the SIM application on the new UICC.

16. The server of claim 10, wherein the message identifies the virtual SIM for retrieval and activation on the mobile communication device.

\* \* \* \* \*